(12) United States Patent
Richardson (10) Patent No.: US 8,539,652 B2
(45) Date of Patent: Sep. 24, 2013

(54) LATCHING FASTENER WITH LOCKING FEATURE

(76) Inventor: Ralph Robin Richardson, Palmer, AK (US)

( * ) Notice: Subject to any disclaimer, the term of this patent is extended or adjusted under 35 U.S.C. 154(b) by 97 days.

(21) Appl. No.: 13/243,235

(22) Filed: Sep. 23, 2011

(65) Prior Publication Data

US 2013/0074296 A1    Mar. 28, 2013

(51) Int. Cl.
*A44B 17/00* (2006.01)

(52) U.S. Cl.
USPC .................................. 24/603; 24/634

(58) Field of Classification Search
USPC ................... 24/634, 635, 648, 603
See application file for complete search history.

(56) References Cited

U.S. PATENT DOCUMENTS

| | | | |
|---|---|---|---|
| 1,576,352 A | 3/1926 | Nordling | |
| 1,824,843 A | 9/1931 | Staley | |
| 2,371,614 A | 3/1945 | Graves | |
| 2,816,340 A * | 12/1957 | Domenech et al. | 24/604 |
| 2,894,763 A | 7/1959 | Karnath et al. | |
| 3,403,650 A | 10/1968 | Black | |
| 3,538,557 A * | 11/1970 | Ichiro | 24/679 |
| 4,379,579 A | 4/1983 | Mahan et al. | |
| 4,613,180 A | 9/1986 | Pope | |
| 4,751,487 A | 6/1988 | Green, Jr. | |
| 5,189,768 A * | 3/1993 | Riceman et al. | 24/634 |
| 5,713,112 A * | 2/1998 | Genero et al. | 24/490 |
| 6,237,201 B1 * | 5/2001 | Bonaiti | 24/598.5 |
| 6,265,956 B1 | 7/2001 | Cascolan et al. | |

* cited by examiner

*Primary Examiner* — James Brittain
(74) *Attorney, Agent, or Firm* — Rylander & Associates, PC; Philip R. M. Hunt (57) ABSTRACT

Latching fastener with male and female parts configured to separatably latch. Several embodiments described, including one where the male part has a latch coupler, the female part has a bistable actuator and a plurality of latches with lower latch levers. To fasten, the latching fastener is configured so that when the female part is pressed down over the male part, the lower latch levers contact the latch coupler, the latch coupler pushes up the lower latch levers, causing rotation of the latches into a latched position. To separate, the latching fastener is configured so that in response to an actuator member of the bistable actuator moving from an upper to a lower stable position, the actuator member pushes down the lower latch levers, the lower latch levers rotate the latches to an unlatched position, and the lower latch levers push down the latch coupler, separating the male and female parts.

11 Claims, 10 Drawing Sheets

LATCHING FASTENER WITH LOCKING FEATURE

FIELD OF THE INVENTION

This invention relates to fastener mechanisms in general and latching fasteners in particular.

BACKGROUND

In the past, snap fasteners have been, for the most part, "friction fasteners" and as such, they have taken considerable force to fasten together. Generally, they are not secure fasteners, as the force to separate them is in general no more than the force required to fasten them. Faults of snap fasteners previously known in the art have lead to losses (e.g. articles falling from holsters or cases which use these fasteners to secure closures). These faults include critical dimensional tolerances, which if not maintained, produce difficulty in closure and failure to stay closed. Wear of the fasteners can change these critical dimensional tolerances, causing looseness and failure to stay closed.

Some previously known fasteners, such as U.S. Pat. No. 3,538,557, are positive holding fasteners having female part with a resilient clamp including fingers that are engageable with a groove in the male part for separably coupling the male and female parts together. These fasteners, although positive in connection, are sometimes difficult to separate, because the resilient clamp is only about one half the diameter of the snap fastener and has a poor operating leverage ratio, it can be difficult to operate when made in small sizes.

U.S. Pat. No. 5,189,768 was an attempt to improve the release of this kind of snap fastener by adding a separate booster spring to aid separation. However, it retains the fault of a poor operating leverage ratio and the small resilient actuator plate makes using the snap fasteners difficult when made in small sizes. Further, it is difficult to construct because the actuator plate is a part of the resilient clamp.

Various quick-release devises can be found in the known art for disengaging a load when the load is either attached or suspended from a hook. While many of these devices are suitable for some applications, they generally become difficult or become incapable of release actuation when built in very small sizes because the load exerted on the jaws of the device is often transmitted to the latching mechanism, jamming the mechanism. In addition to operational deficiencies the known art devices often are complicated and structurally heavy, in comparison to the loads they are able to carry. For these reasons, quick-release devices of the general type have limited application in very small sizes and have achieved limited acceptability in the field. Typical remote coupling or locking devices found in the known art are represented by the following: U.S. Pat. Nos. 1,576,352; 1,824,843; 2,894,763; 3,403,650; 4,379,579; and 4,613,180. These devices are primarily single point connection devices and do not offer stability for the connected device during release. Accordingly, there exists a substantial need for an electro-mechanical quick-release device which is efficient, effective and inexpensive to manufacture and can be made in micro sizes.

SUMMARY, OBJECTS, AND ADVANTAGES

Embodiments herein describe a latching fastener comprising a male fastener part with a latch coupler and a female fastener part configured to separatably latch to the male fastener part. The female fastener part has a frame and a bistable actuator coupled to the frame. The bistable actuator has an actuator member configured to move between upper and lower stable positions. The female fastener part has a plurality of latches mounted on the frame, the latches configured to rotate between a latched position and an unlatched position. The latches have lower latch levers configured to rotate the latches to the unlatched position in response to the actuator member moving to its lower stable position and pushing down the lower latch levers. The lower latch levers are configured to rotate the latches to the latched position in response to the latch coupler pushing up the lower latch levers. The lower latch levers have fulcrum elbows configured to contact the latching coupler of the male fastening part. The fulcrum elbows are configured to rotate at such contact during unlatching and cause the female latching fastener part to be raised away from the latch coupler as the latches are rotated out of the latched position. The fulcrum elbows are also configured to rotate at such contact during latching and cause the latches to rotate into the latched position in response to the downward motion of the female latching part.

In a first embodiment, the bistable actuator comprises a snap spring coupled to the frame, wherein the snap spring is configured to be bistable between an upwardly convex form and an upwardly concave form. The actuator member comprises a thimble coupled to the snap spring. The snap spring is configured to apply the upward stabilizing force on the actuating member when the snap spring is between the upwardly convex form and a neutral form. The snap spring is further configured to generate the downward stabilizing force on the actuating member when the snap spring is between the upwardly concave form and the neutral form. The snap spring is configured to receive a downward switching force from an external source such as a finger. The thimble is configured to move toward the lower stable position in response to any downward switching force sufficient to overcome the upward stabilizing force.

In a second embodiment, the bistable actuator further comprises a bistable latching solenoid coupled to the frame. The actuator member comprises an actuator shaft coupled to a spider assembly. The bistable latching solenoid is configured to apply an upward switching force on the actuator member when a current in a first direction is applied to the bistable latching solenoid. There are one or more permanent magnets in the bistable latching solenoid configured to provide the upward stabilizing force and the downward stabilizing force. The upward switching force is sufficient to overcome the downward stabilizing force and move the actuator member towards the upper stable position. The bistable latching solenoid is configured to apply a downward switching force on the actuator member when a current in an opposite direction to the first direction is applied to the bistable latching solenoid. The downward switching force is sufficient to overcome the upward stabilizing force and move the actuator member towards the lower stable position.

The first embodiment snap latching fastener may be used for fastening garments, tent flaps, instrument cases, camera cases, cell phone cases, industrial safety clothing and many other applications. The snap latching fastener provides ease of application and secure fastening greater than available by use of friction type snap fasteners. The snap latching fastener provides a fastener in which lateral forces are supported by the frame, removing the wear caused by lateral forces from the latch mechanism. Because the operating snap spring plate is large in comparison to the diameter of the snap latching fastener, and is protected from over extension in either direction of movement, it may be made of a thin stainless alloy allowing operation by means of a very light touch. A great advantage to invalids or those who have nerve damage in their hands, when they are clothing themselves.

Further the second embodiment provides a solenoid latching fastener which is simple in construction, can be built in very small sizes and can be operated by remote control. Accordingly, it is an object of the second embodiment to provide a simple, inexpensive, quick-release device which is rugged, compact and has a minimum of working parts. Another object of the second embodiment is to provide a quick-release device which will positively release under the application of loads. Another object of the second embodiment is to provide a compact, quick-release device in which axial loads are applied to the load-supporting members and not transferred to the latching mechanism to provide positive load-free release operation. Still another object is to provide a quick-release device which may be operated as a remote controlled solenoid operated device. A further object of this invention is to provide a release device which will maintain the object to which it is attached in a stable position before release and release the object with a small impulse sufficient to remove the object from the vicinity of the transportation vehicle. Another object is to present a release device in which the latches when in their released position are forced into protective latch recesses where they cannot interfere with disengaging of the female release device from the male latch coupler. A final object is to provide a quick release device which can be manually connected and or connected and released by a permanent magnet bistable electric solenoid which does not require a constant current to maintain the quick release device in its connected or its released state.

Devices as described herein may be used where it is desired to releasably connect to a light or very light load. Typical of such applications are those for releasing instruments from Airplanes, weather balloons and space craft.

BRIEF DESCRIPTION OF THE DRAWINGS

The present invention will be described by way of exemplary embodiments, illustrated in the accompanying drawings in which like references denote similar elements, and in which.

REFERENCE NUMBERS USED IN DRAWINGS

In the drawings, similar reference characters denote similar elements throughout the several figures. With regard to the reference numerals used, the following numbering is used throughout the various drawing figures:

5 Snap latching fastener
6 Female fastener part
7 Male fastener part
10a Frame
11 Outer cover
12 Snap spring
13 Snap rivet
14 Thimble
15 Thimble stop
16 Latch locater ring
17 Ring stake
18 Fixing piece
19 Washer
20 Plastic deformation recess
21 Belt part
22 Projection
23 Pin
24 Formed edge
25a Latch
26a Boss
27a Upper latch lever
28a Lower latch lever
29 Fulcrum elbow
30a Axel
31a Bearing
32 Latch coupler
33 Base flange
34 Base
35 Rivet
36 Rivet head
37 Central recess
38 Material upper sheet
39 Material lower sheet
140 Upper latch recess
40 Lower latch recess
41 Latch coupler assembly
42 Bistable latching solenoid
43 Actuator mounting plate
44 Assembly bolt
45 Spider assembly
46 Spider rollers
47 Actuator shaft
48 Latch hold down
49 Latch coupler attachment
10b Frame
25b Latch
26b Boss
27b Upper latch lever
28b Lower latch lever
30b Axel
31b Bearing
50 Rib
57 Latch Recess
100 Solenoid latching fastener

DETAILED DESCRIPTION

In the following detailed description, reference is made to the accompanying drawings which form a part hereof wherein like numerals designate like parts throughout, and in which are shown, by way of illustration, specific embodiments in which the invention may be practiced. It is to be understood that other embodiments may be utilized and structural changes may be made without departing from the scope of the present invention. Therefore, the following detailed description is not to be taken in a limiting sense, and the scope of the present invention is defined by the appended claims and their equivalents.

Reference in the specification to "one embodiment" or "an embodiment" means that a particular feature, structure, or characteristic described in connection with the embodiment is included in at least one embodiment. The appearances of the phrase "in one embodiment" in various places in the specification do not necessarily all refer to the same embodiment, but they may.

The phrase "A and/or B" means (A), (B), or (A and B). The phrase "A, B, and/or C" means (A), (B), (C), (A and B), (A and C), (B and C) or (A, B and C).

The description may use perspective-based language such as up/down, back/front, and top/bottom. Such language is merely used to facilitate the discussion, providing a relative frame of reference and is not intended to restrict the application of embodiments of the present invention.

First Embodiment

Snap Latching Fastener

Figure 1:
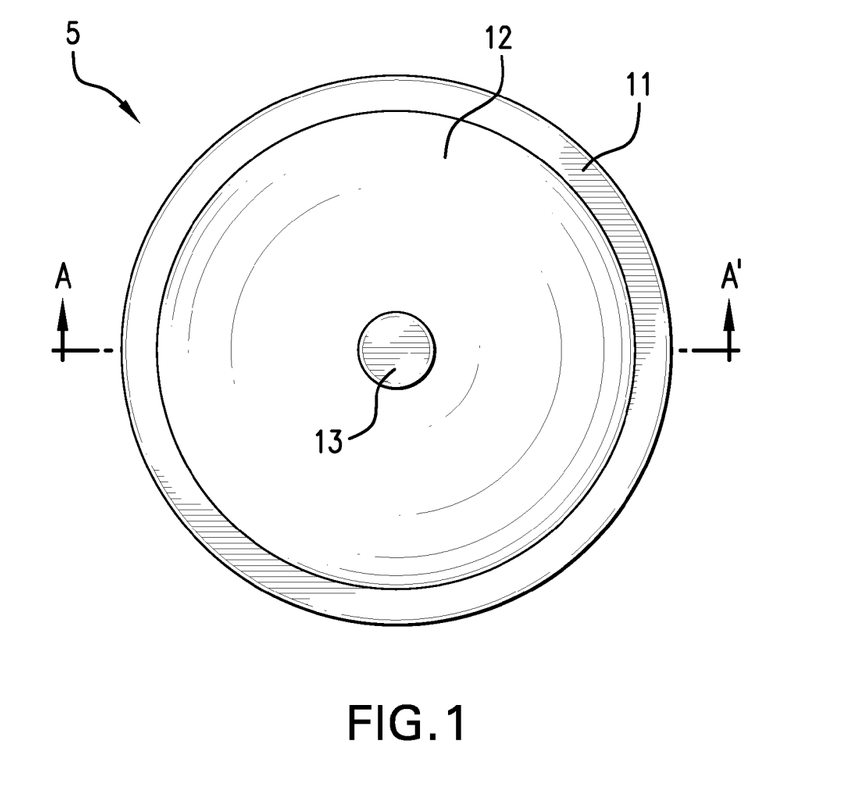
FIG. 1 is a top view of a first embodiment of the present invention, a snap latching fastener.
Figure 2:
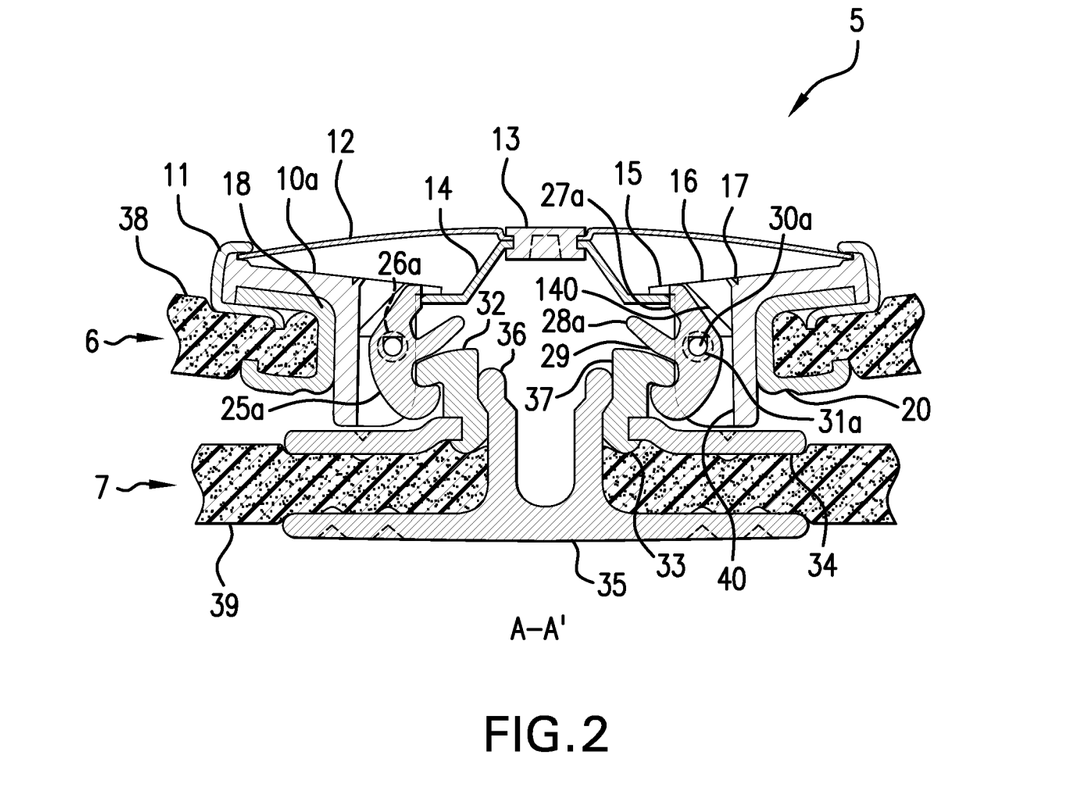
FIG. 2 is a cross section of the male and female parts of the first embodiment along the line A-A' in a latched state.
Figure 3:
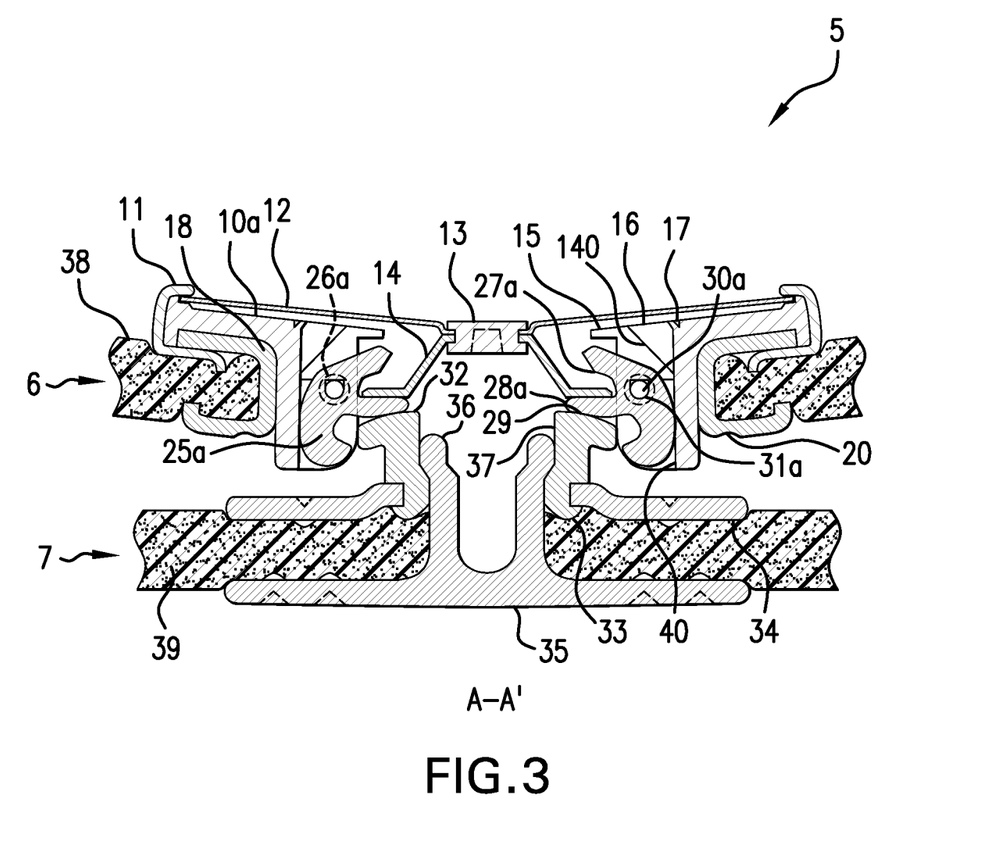
FIG. 3 is a cross section of the male and female parts of the first embodiment along the line A-A' in an unlatched state.
Figure 4:
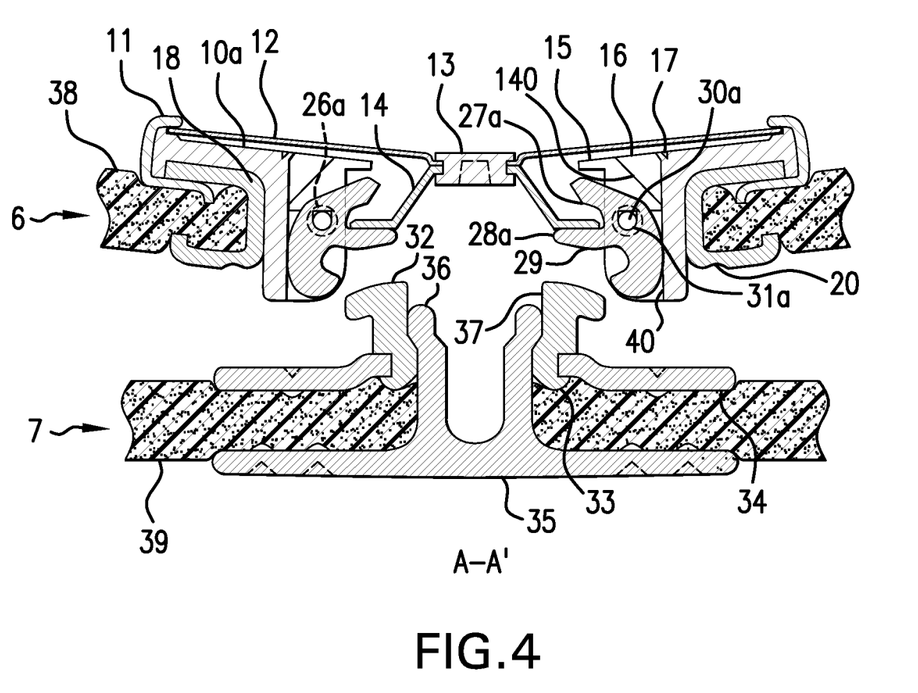
FIG. 4 is a cross section of the male and female parts of the first embodiment along the line A-A' in an unlatched and separated state.

FIGS. 1-4 illustrate a first embodiment of the present invention, that of a snap latching fastener 5. The snap latching fastener 5 comprises a female fastener part 6 and male fastener part 7. FIG. 1 shows a top view of the snap latching fastener. Specifically, a top view of the female fastener part 6. FIG. 2 is a cross section of the male and female parts of the snap latching fastener 5 along the line A-A' in a latched state. FIG. 3 shows a cross section of the male and female parts of the snap latching fastener 5 along the line A-A' in an unlatched state. FIG. 4 shows a cross section of the male and female parts of the snap latching fastener 5 along the line A-A' in an unlatched and separated state.

The female fastener part 6 has a frame 10a on which are mounted the parts of the female fastener part 6. Formed in the frame 10a are a plurality of bearings 31a and lower latch recesses 40. The female fastener part 6 has a plurality of latches 25a deposed in the lower latch recesses 40. The latches 25a have axels 30a which are supported by the bearings 31a. The latches 25a are configured to rotate upon the axels 30a. The latches 25a have a boss 26a on each side, which centralize the latches 25a in their respective lower latch recesses 40, and prevent binding. The axels 30a and the latches 25a are retained in the frame 10a by a latch locater ring 16 (see FIG. 7). The latch locater ring 16 has a thimble stop 15. Ring stake 17 retains the latch locater ring 16 in the frame 10a. Each of the latches 25a has a lower latch lever 28a and an upper latch lever 27a. Each of the latches 25a may be rotated by force applied to its upper latch lever 27a or lower latch lever 28a. A thimble 14 is attached by snap rivet 13 to snap spring 12 that together act as a bistable actuator. The snap spring 12 is attached to the frame 10a by an outer cover 11. The snap spring 12 is configured to be bistable between an upwardly convex form and an upwardly concave form with a neutral form in between. When the snap spring 12 is in any form between the upwardly convex form and the neutral form, it will snap to the upwardly convex form. When the snap spring 12 is in any form between the upwardly concave form and the neutral form, it will snap to the upwardly concave form.

The outer cover 11 also retains fixing piece 18. The fixing piece 18 is swaged onto the frame 10a and fixes material upper sheet 38 between the fixing piece 18 and the outer cover 11, thereby attaching the female fastener part 6 to the material upper sheet 38.

The male fastener part 7 of the snap latching fastener 5 includes a latch coupler 32, a base 34 and a rivet 35. The base 34 has a base flange 33 which holds the latch coupler 32 to the base 34. The latch coupler 32 has a dome shaped upper surface which facilitates locating the female fastener part 6 onto the latch coupler 32 and the base 34. The assembly of the latch coupler 32 and base 34 are attached to a material lower sheet 39 by the rivet 35. The rivet 35 has a rivet head 36 expanded in a central recess 37 of the latch coupler 32. The material lower sheet 39 is clamped between the rivet 35 and the assembly of the latch coupler 32 and base 34. The method of expanding the rivet head 36 into the central recess 37 of the latch coupler 32 allows the rivet 35 to be of a single length, which accommodates a greater thickness variation of the material lower sheet.

First Embodiment

Operation

Starting from an unlatched and separated state (FIG. 4), when it is desired to connect the female fastener part 6 to the male fastener part 7, the outer cover 11 on the female fastener part 6 is pressed down over the male fastener part 7 by pressure on the outer cover 11 exerted by an external force (e.g. user fingers). This causes the lower latch levers 28a, when they contact the upper surface of the latch coupler 32, to be pushed upwards and thereby rotate the latches 25a into their latched position against the latch coupler 32 (see FIG. 3). The lower latch levers 28a during rotation force the thimble 14, the snap rivet 13, and the snap spring 12 to move upward. This moves the snap spring 12 past its neutral position during connection of the female fastener part 6 to the male fastener part 7, making unnecessary a separate spring which would be needed to assist the return of the snap spring 12 past its neutral position into a convex upward position, as was disclosed in U.S. Pat. No. 5,189,768. As the snap spring 12 is forced upward past its neutral position, it snaps into a convex upward position and by so doing moves the thimble 14 to an upper position. In this upper position, lower, outer edges of the thimble 14 contact against the thimble stop 15, which stops the thimble 14 from moving upward beyond its upper position. Force from the snap spring 12 in its upward convex position, pulling the thimble 14 against the thimble stop 15, with the lower, outer edges of the thimble 14 preventing the latches 25a from rotating. This maintains the snap latching fastener 5 in a latched and locked state (FIG. 2).

When it is desired to release the snap latching fastener 5, the snap spring 12 is pressed at its central position by an external force (e.g. user finger), moving the snap rivet 13 and thimble 14 down past the neutral position of the snap spring 12. As the thimble 14 is moved downward it releases the latches 25a for rotation by moving down away from the thimble stop 15 and upper latch levers 27a. The thimble 14 contacts and pushes down the lower latch levers 28a rotating the lower part of the latches 25a out of engagement with the latch coupler 32 while at the same time causes the lower latch levers to press against the top surface of the latch coupler 32. This levers the female fastener part 6 upwards away from the latch coupler 32. When snap spring 12 passes its neutral position, it snaps into its concave upward position, clamping the latches 25a into the lower latch recesses 40, completely freeing and releasing the female fastener part 6 from the latch coupler 32 of the male fastener part 7 (FIG. 4).

Inadvertent release of the snap fastener 5 by pressure over the entire upper surface of the snap fastener 5 is prevented because downward force on the outer cover 11 would be transmitted through the latches 25a to the lower latch levers 28a, pressing them down on the latch coupler 32, applying a latching torque to the latches 25a that would tend to rotate them toward the latched position. This latching torque is sufficient to counter balance the downward force transmitted through the snap spring 12 and thimble 14, pressing down on the lower latch levers 28a, applying an unlatching torque to the latches that tends to rotate them toward the unlatched position. The latches 25a are thus prevented from rotating far enough to allow the snap spring 12 to pass its neutral position to its concave upward position. To this end, the latches 25a have fulcrum elbows 29 located on each lower latch lever 28a such that position of the fulcrum elbow 29 regulates two conditions. First the ease of connecting or releasing the snap fastener 5. Second, the prevention of premature release of the snap fastener 5 by inadvertent pressure over the entire top of the snap fastener 5. Moving the fulcrum elbow 29 outwards towards the axels 30a makes release of the snap fastener 5 easier and connection more difficult. Moving the fulcrum elbow 29 away from the axel 30a makes premature release of the snap fastener 5 by inadvertent pressure over the entire top of the snap fastener 5 less likely.

First Embodiment

Additional Component Detail

Several components of the first embodiment will now be described in more detail.

Referring to FIGS. 1-4, the outer cover 11 projects outwardly and has a lower edge folded inwardly and then downwardly at the lower part. This outer cover 11 has three purposes. First, it retains the snap spring 12, holding the snap spring 12 against the frame 10. Second, it acts as a finishing edge. Third, the lower edge of the outer cover 11, in conjunction with an outer edge of a lower arctate surface of fixing piece 18 provides a clamping force on the material upper sheet 38. The amount of clamping force available is largely determined by the spring back property of the material used for the fixing piece 18. However, the clamping force can be easily changed to accommodate various materials or fabrics to which the snap fastener 5 is applied by making changes to the thickness of fixing piece 18 at a plastic deformation recess 20 within the fixing piece 18. The plastic deformation recess 18 is provided in accordance with U.S. Pat. No. 2,371,614, which provides a way of securing parts together. The plastic deformation recess 20 locates the area of plastic deformation (bending) and controls the clamping force without changing the thickness of the entire fixing piece 18. Because of the extreme holding power of the snap fastener 5, the snap fastener 5 must be securely fastened to its material so that it will neither pull free from the material due to insufficient clamping force nor tear free from the material due to excessive clamping force. Thus the female fastener part 6 is configured to provide a desired clamping force for whatever material it is applied to without modification to the female fastener part other than the change to the thickness of the fixing piece 18 at the plastic deformation recess 20. This is more efficient than changing the thickness of the entire fixing piece 18. Thus a snap latching fastener 5 may be used with many different materials such as plastics, fabrics, and leathers by simply selecting the fixing piece 18 with the correct thickness in plastic deformation recess 20 required to secure the correct clamping force needed for the particular material. Also because the fixing piece 18 is stressed beyond its plastic limit at the plastic deformation recess, materials of various thicknesses will be clamped by substantially the same spring back force.

Figure 5:
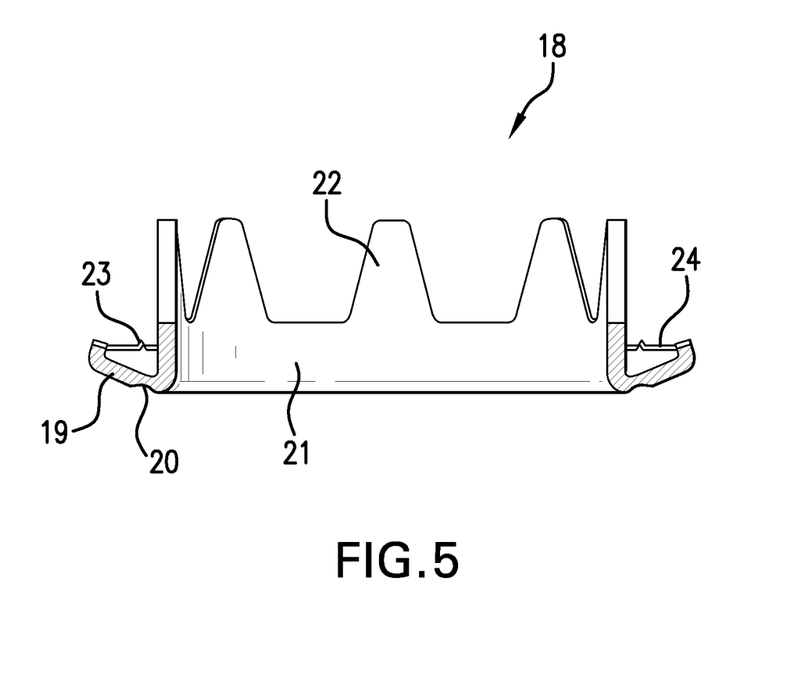
FIG. 5 is a cross sectional elevation of a fixing piece for the female part of the first embodiment before being installed to attach the upper material to the female part.

As shown in FIG. 5, the fixing piece 18 comprises a washer 19 that transitions at a bend to a belt part 21 and has a plurality of upwardly extending projections 22 from the upper edge of the belt part 21. On the outer edge of the washer 19 are pins 23 which in conjunction with a formed edge 24 serve to firmly grip the material upper sheet 38. The fixing piece 18 has three important functions. First, before it is swaged, it is placed in a preformed hole in the material upper sheet 38 to locate the material upper sheet 38 to the female fastener part 6. Second, the upwardly extending projections 22 are swaged into the space between the outer cover 11 and the frame 10a to fasten the material upper sheet 38 and fixing piece 18 to the frame 10a of the female fastener part 6. Third, the washer 19 is constructed to an acute angle in relation to the belt part 21 of the fixing piece 18. During swaging of the fixing piece 18, the washer 19 will be swaged beyond its elastic limit back to an approximate right angle in relation to the belt part 21. Thus the fixing piece 18, in conjunction with the outer cover 11, fastens the material upper sheet 38 with the clamping force provided by the residual spring back of the fixing piece 18 and fastens the material upper sheet 38 with a firm grip provided by the pins 23 and the formed edge 24.

Figure 6:
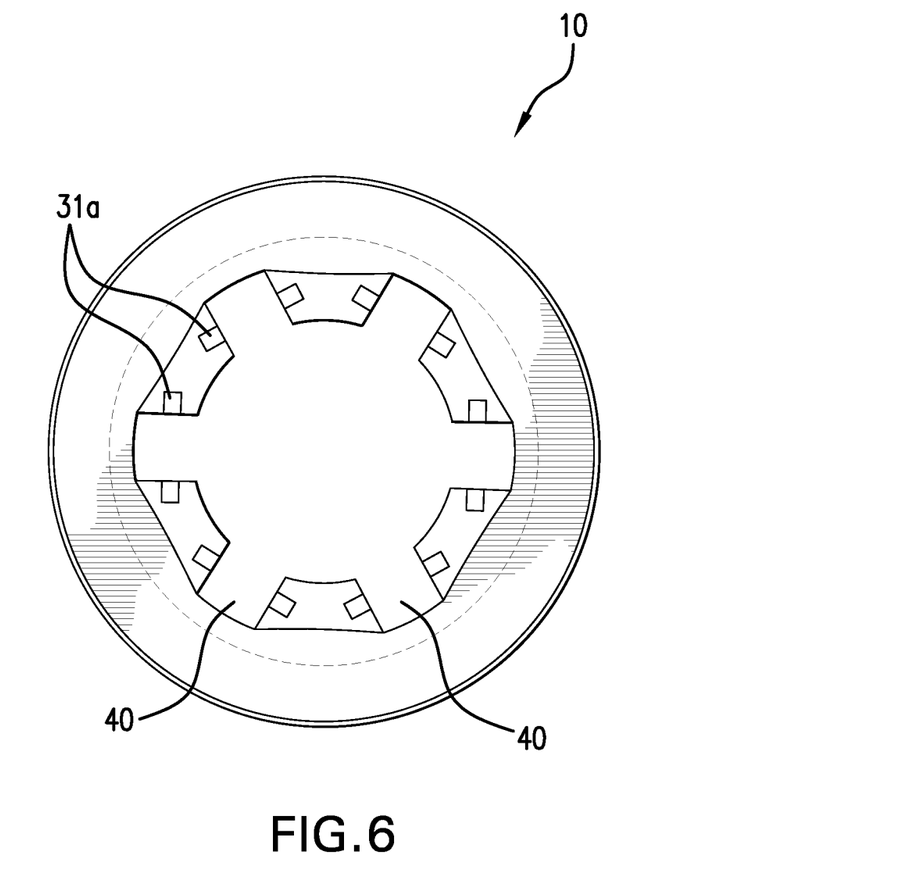
FIG. 6 is a top view of the frame.

FIG. 6 is a top view of the frame 10a, showing it in greater detail. The frame 10a may be formed by micro forging or injection molding techniques which produce parts of high quality and close tolerances. The frame 10a contains an upper recess to accommodate snap spring 12 and a lower recess to accommodate latch locater ring 16 (see FIGS. 2 and 7). As described above, the frame 10a has formed lower latch recesses 40 to accommodate latches 25a and also has bearings 31a for holding axels 30a on which the latches 25a rotate. Since the lower latch recesses 40 extend upwards to communicate with the latch locater ring 16, the frame 10a is constructed to enable the latch locater ring 16 to be indexed to the frame 10a in order to keep the lower latch recesses 40 in alignment with upper latch recesses 140 in the latch locater ring 16. This may be done making the latch locater ring 16 hexagonal in shape and making the frame 10a with a matching hexagonal recess into which the latch locator ring 16 is nested.

Figure 7:
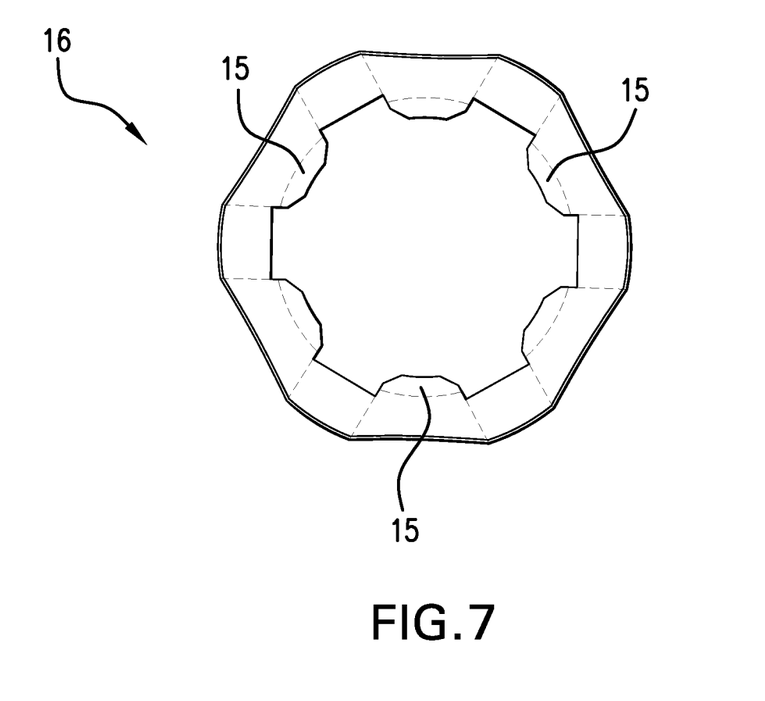
FIG. 7 is a top view of the latch locater ring.

FIG. 7 shows a top view of the latch locater ring 16. The latch locater ring 16 also may be formed by micro forging. In addition to holding the latches 25a in place, the latch locater ring 16 has an upper inner projection which is the thimble stop 15. The latch locater ring 16 is held in the frame 10a by staking material from the frame 10a over an upper outer edge of the latch locater ring 16.

Second Embodiment

Solenoid Latching Fastener

Figure 8:
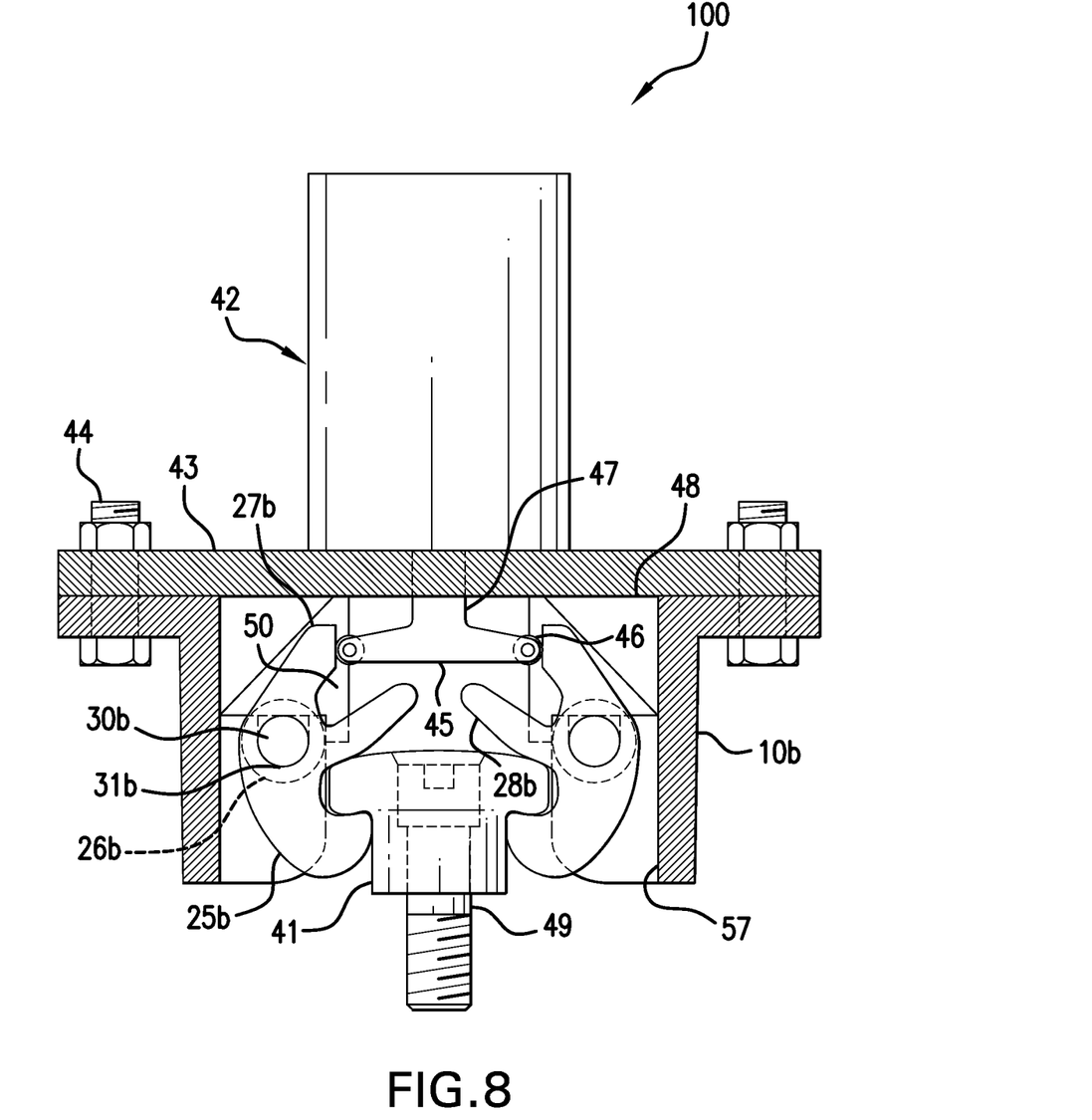
FIG. 8 shows a second embodiment, that of a solenoid latching fastener, cross sectional view, shown in a latched state.
Figure 9:
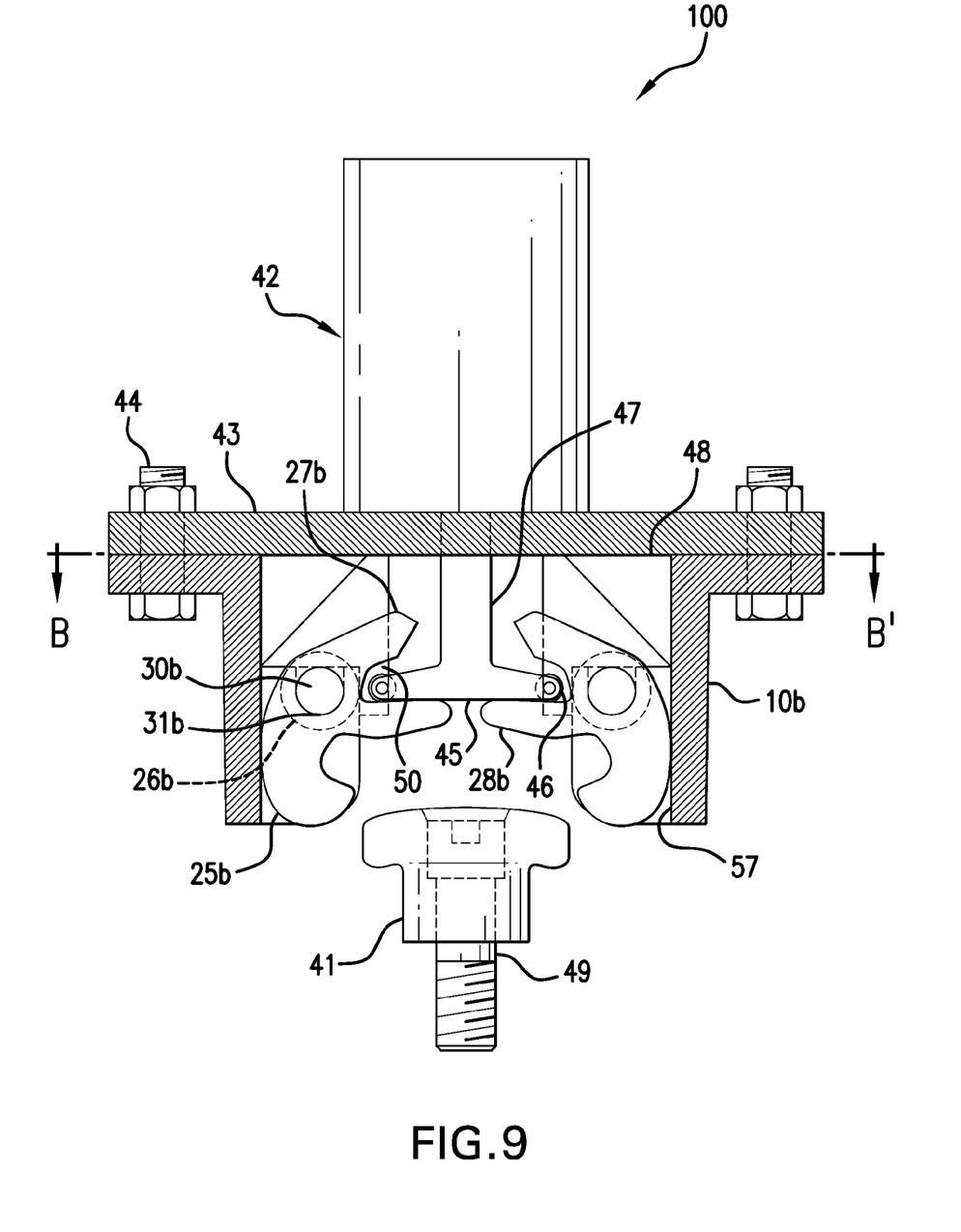
FIG. 9 shows the solenoid latching fastener in an unlatched and separated state.

This second embodiment provides a solenoid latching fastener 100 of a low friction design, quick releasing, capable of being constructed in micro as well as larger sizes. The solenoid latching fastener 100 may be operated by manually connecting and then released by remote control. Alternatively, the solenoid latching fastener 100 may be operated by remote control, connecting and releasing using suitable orientation and alignment programs and systems. FIG. 8 the solenoid latching fastener 100, cross sectional view, shown in a latched state. FIG. 9 shows the solenoid latching fastener 100 in an unlatched and separated state.

The solenoid latching fastener 100 has a frame 10b which is attached by fasteners 44 to an actuator mounting plate 43. The frame 10b hold a plurality of latches 25b, each with an upper latch lever 27b and a lower latch lever 28b. A bistable actuator comprising a bistable latching solenoid 42 is attached to the actuator mounting plate 43. The bistable latching solenoid 42 has an actuator member configured to move between an upper stable position and a lower stable position. The actuator member comprises an actuator shaft 47 coupled to a spider assembly 45. The spider assembly 45 is configured to move between the upper latch levers 27b and the lower latch levers 28b of the latches 25b, thereby controlling the latching or unlatching of the solenoid latching fastener 100.

The bistable latching solenoid 42 has a permanent magnet configured to apply an upward stabilizing force on the actuator member when the actuator member is between the upper stable position and a neutral position and apply a downward stabilizing force on the actuator member when the actuator member is between the lower stable position and the neutral position. The bistable latching solenoid 42 is further configured to apply an upward switching force on the actuator member when a current in a first direction is applied to the bistable latching solenoid 42. The current applied is sufficient to make the upward switching force sufficient to overcome the downward stabilizing force and move the actuator member towards the upper stable position. Similarly, the bistable latching solenoid 42 is configured to apply a downward switching force on the actuator member when a current in an opposite direction to the first direction is applied to the bistable latching solenoid, the downward switching force sufficient to overcome the upward stabilizing force and move the actuator member towards the lower stable position.

The spider assembly 45 contacts latches 25b by means of spider rollers 46 which reduce friction and improve performance. Each latch 25b has bosses 26b which centralize the latches 25b in latch recesses 57 in the frame 10b. The latches 25b are mounted on axels 30b which rest in bearings 31b. The bearings 31b are formed in the frame 10b. The axels 30b are held in place by a latch hold down 48. The latch hold down 48 is retained by the latch actuator plate 43 and assembly bolts 44.

Figure 10:
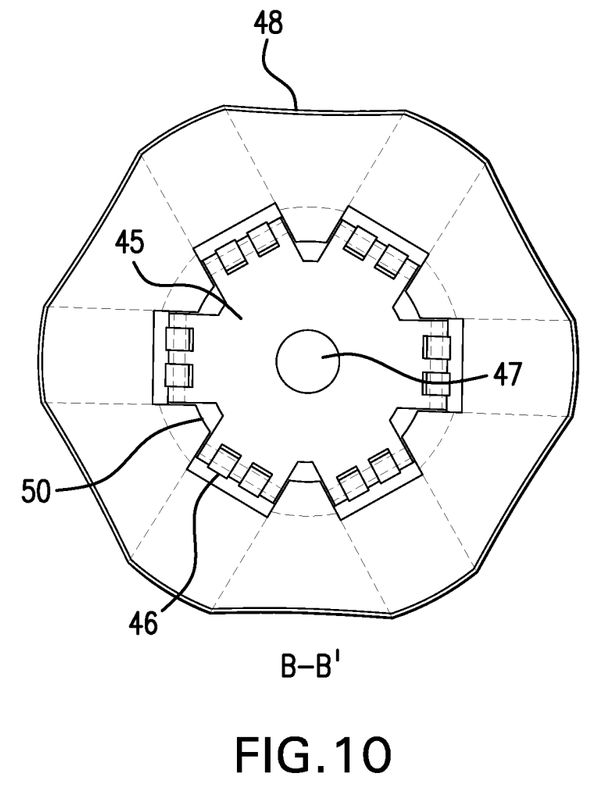
FIG. 10 is a top view of the latch hold down and the spider assembly, latches not shown.

FIG. 10 is a top view of the latch hold down 48, the spider assembly 45, with the latches 25b not shown. Ribs 50 on an inner edge of the latch hold down 48 guide the spider rollers 46 and keep the spider rollers 46 in alignment with latches 25b to provide a low friction contact between the spider assembly 45 and the latches 25b and to facilitate operation even when the solenoid latching fastener 100 is attached to heavy loads.

Second Embodiment

Operation

As shown in FIGS. 8-9, the solenoid latching fastener 100, the second embodiment of the invention, is controlled by the bistable latching solenoid 42, such as those described in U.S. Pat. No. 4,751,487 and U.S. Pat. No. 6,265,956. As such, the bistable latching solenoid 42 may be driven positively in either direction by a reversal of coil current and held in place at either end by flux from a permanent magnet located at the center of the bistable latching solenoid 42. Thus the bistable latching solenoid 42 can provide the same function essentially as the snap spring 12 of the first embodiment, but with an electric impulse instead of a manual impulse. The thimble 14 of the first embodiment is replaced by the spider assembly 45, because as the solenoid latching fastener 100 must operate under a loaded condition, the spider assembly 45 provides low friction rolling contact between the spider assembly 45 and upper latch levers 27b and lower latch levers 28b of the latches 25b. The thimble stop 15 used in the first embodiment is not necessary for the second embodiment as motion limits of the spider assembly 45 are controlled by stops built into the bistable latching solenoid 42. Rims are provided on the inner edge of the latch hold down 48 to maintain alignment of the spider rollers 46 with the upper latch levers 27b and lower latch levers 28b.

To attach the solenoid latching fastener 100 to a latch coupler assembly 41, in the case of the smaller versions of the quick release latching fasteners 100, it is only necessary to be certain the solenoid latching fastener 100 is in its unlatched position (FIG. 9). Then the latch coupler assembly 41 is pressed into the solenoid latching fastener 100, pushing up the lower latching levers 28b, which push the spider assembly 45 and actuator shaft 47 upwards, causing the magnetic latch of the bistable latching solenoid 42 to release and switch to the magnetically latched opposite position (FIG. 8), where it will be held until it is released by an electric impulse to the bistable latching solenoid 42. In the case of larger sizes of latching quick release latching fasteners 100, it is necessary to assure the bistable latching solenoid 42 is in its released position, then after bringing the latch coupler assembly 41 into contact with the solenoid latching fastener 100, the solenoid in the bistable latching solenoid 42 is activated to switch to its magnetically latched coupling position. In either case to release either size of quick release latching fastener 100 it is only necessary to send a signal to the solenoid to switch the solenoid from its magnetically latched and locked coupling position to its magnetically latched release position (FIG. 9).

Not shown, is a third embodiment, similar to the second embodiment, would be a manually operated quick release latching fastener where the operating solenoid in the actuator is replaced by a manually operated control shaft with stops to limit motion in either direction and ball bearing detents on the shaft to maintain the operating shaft and latches in either the latched or unlatched position.

CONCLUSION, RAMIFICATIONS, AND SCOPE

While the above descriptions contain many specificities, these should not be construed as limitations on the scope of any embodiment, but as exemplifications of the presently preferred embodiments thereof. Many other ramifications and variations are possible within the teachings of the various embodiments. For example, latching fasteners may be constructed in many sizes and colors and of many different materials including metals plastics and composites, and may be used to secure doors on cabinets, flaps on tents, cases for cell phones, covers for instruments, canvas enclosures for boats, camera cases, binocular cases, clothing, safety clothing, safety harness, tool belt pockets, tool retainers and many other items. The second embodiment is a useful mechanism for use to hold and release items remotely, such as a weather recording device to be released from a balloon at a particular elevation, or a listening device released from a remotely operated drone.

Although specific embodiments have been illustrated and described herein, it will be appreciated by those of ordinary skill in the art and others, that a wide variety of alternate and/or equivalent implementations may be substituted for the specific embodiment shown and described without departing from the scope of the present invention. This application is intended to cover any adaptations or variations of the embodiment discussed herein. Therefore, it is manifested and intended that the invention be limited only by the claims and the equivalents thereof.

I claim:

1. A latching fastener comprising:
   a male fastener part with a latch coupler;
   a female fastener part configured to separatably latch to the latch coupler;
   a frame, part of the female fastener part;
   a bistable actuator coupled to the frame, the bistable actuator having an actuator member configured to move between an upper stable position and a lower stable position;
   a plurality of latches mounted on the frame, the latches configured to rotate between a latched position and an unlatched position;
   the latches having lower latch levers configured to rotate the latches to the unlatched position in response to the actuator member moving to its lower stable position and pushing down the lower latch levers; and
   the lower latch levers further configured to rotate the latches to the latched position in response to the latch coupler of the male fastener part pushing up the lower latch levers;
   wherein the bistable actuator is configured to apply an upward stabilizing force on the actuator member when the actuator member is between the upper stable position and a neutral position;
   wherein the bistable actuator is configured to apply a downward stabilizing force on the actuator member when the actuator member is between the lower stable position and the neutral position;
   wherein the bistable actuator comprises a snap spring coupled to the frame, wherein the snap spring is configured to be bistable between an upwardly convex form and an upwardly concave form; and
   wherein the actuator member comprises a thimble coupled to the snap spring.

2. The latching fastener of claim 1, wherein:
   the latches having upper latch levers configured to engage with the actuator member to prevent rotation of the latches out of the latched position when the actuator member is in its upper stable position.

3. The latching fastener of claim wherein:
   the snap spring configured to apply the upward stabilizing force on the actuating member when the snap spring is between the upwardly convex form and a neutral form;
   the snap spring configured to generate the downward stabilizing force on the actuating member when the snap spring is between the upwardly concave form and the neutral form; and
   the snap spring configured to receive a downward switching force; and
   the thimble configured to move toward the lower stable position in response to any downward switching force sufficient to overcome the upward stabilizing force.

4. The latching fastener of claim 1, wherein:
   the latches having upper latch levers configured to engage with the thimble thereby locking the latches by preventing rotation of the latches out of the latched position when the thimble is interposed between the upper latch levers.

5. The latching fastener of claim 1, further comprising:
   a fixing piece coupled with the frame, the fixing piece configured to provide a clamping force when swaged to a material upper sheet, thereby securing the material upper sheet to the female fastening part;
   a plastic deformation recess in the fixing piece, wherein a thickness of the fixing piece at the plastic deformation recess determines an amount of clamping force provided; and
   whereby the clamping force required by any particular material may be provided by selecting the fixing piece with a correct thickness at the plastic deformation recess.

6. The latching fastener of claim 5, wherein:
   the fixing piece secures the material upper sheet by a spring force produced by stressing the fixing piece at the plastic deformation recess beyond its elastic limit but appreciably less than its point of failure.

7. The latching fastener of claim 1, further comprising:
   a hollow rivet configure couple to the latching coupler of the male fastening part, the hollow rivet configured to expand into a formed recess in the latching coupler, thereby securing a material lower sheet to the male fastening part; and
   whereby the hollow rivet is provided in a single length to accommodate attachment to thick or thin materials.

8. A latching fastener comprising:
   a male fastener part with a latch coupler;
   a female fastener part configured to separatably latch to the latch coupler;
   a frame, part of the female fastener part;
   a bistable actuator coupled to the frame, the bistable actuator having an actuator member configured to move between an upper stable position and a lower stable position;
   a plurality of latches mounted on the frame, the latches configured to rotate between a latched position and an unlatched position;
   the latches having lower latch levers configured to rotate the latches to the unlatched position in response to the actuator member moving to its lower stable position and pushing down the lower latch levers; and
   the lower latch levers further configured to rotate the latches to the latched position in response to the latch coupler of the male fastener part pushing up the lower latch levers;
   wherein the bistable actuator is configured to apply an upward stabilizing force on the actuator member when the actuator member is between the upper stable position and a neutral position;
   wherein the bistable actuator is configured to apply a downward stabilizing force on the actuator member when the actuator member is between the lower stable position and the neutral position;
   the bistable actuator further comprises a bistable latching solenoid coupled to the frame;
   the actuator member comprises an actuator shaft coupled to a spider assembly;
   wherein the bistable latching solenoid is configured to apply an upward switching force on the actuator member when a current in a first direction is applied to the bistable latching solenoid, the upward switching force sufficient to overcome the downward stabilizing force and move the actuator member towards the upper stable position; and
   wherein the bistable latching solenoid is configured to apply a downward switching force on the actuator member when a current in an opposite direction to the first direction is applied to the bistable latching solenoid, the downward switching force sufficient to overcome the upward stabilizing force and move the actuator member towards the lower stable position.

9. The latching fastener of claim 8, wherein:
the spider assembly has a plurality of spider rollers configured to provide a rolling contact between the actuator member and the latches.

10. The latching fastener of claim 8, further comprising:
one or more permanent magnets in the bistable latching solenoid configured to provide the upward stabilizing force and the downward stabilizing force.

11. A latching fastener comprising:
a male fastener part with a latch coupler;
a female fastener part configured to separatably latch to the latch coupler;
a frame, part of the female fastener part;
a bistable actuator coupled to the frame, the bistable actuator having an actuator member configured to move between an upper stable position and a lower stable position;
a plurality of latches mounted on the frame, the latches configured to rotate between a latched position and an unlatched position;
the latches having lower latch levers configured to rotate the latches to the unlatched position in response to the actuator member moving to its lower stable position and pushing down the lower latch levers;
the lower latch levers further configured to rotate the latches to the latched position in response to the latch coupler of the male fastener part pushing up the lower latch levers;
the lower latch levers have fulcrum elbows configured to contact the latching coupler of the male fastening part;
the fulcrum elbows are configured to rotate at such contact during unlatching and cause the female latching fastener part to be raised away from the latch coupler as the latches are rotated out of the latched position; and
the fulcrum elbows are configured to rotate at such contact during latching and cause the latches to rotate into the latched position in response to a downward motion of the female latching part.

* * * * *